Nov. 19, 1929.   F. A. CANON ET AL   1,735,951
PROCESS OF CARRYING ON CATALYTIC REACTIONS
Filed June 12, 1922

Inventors,
Frank A. Canon and
Chester E. Andrews.
By
Attorney

Patented Nov. 19, 1929

1,735,951

UNITED STATES PATENT OFFICE

FRANK A. CANON AND CHESTER E. ANDREWS, OF PITTSBURGH, PENNSYLVANIA, ASSIGNORS TO THE SELDEN RESEARCH & ENGINEERING CORPORATION, OF PITTSBURGH, PENNSYLVANIA, A CORPORATION OF DELAWARE

PROCESS OF CARRYING ON CATALYTIC REACTIONS

Application filed June 12, 1922. Serial No. 567,740.

In the art of exothermic chemical reactions very practical difficulties have been experienced in dissipating the excessive heat thereby generated.

The catalytic air oxidation of naphthalene to phthalic anhydride is an example of such a reaction. In that process the optimum temperature is above 400° C., lying roughly between 400° and 450° C., but much higher temperatures will automatically build up unless prevented.

It is the object of the present invention to provide an improved process for carrying out exothermic chemical reactions of this character which will permit the zone of reaction to reach and maintain a desired operating temperature, but will prevent its rise to an abnormal degree thereabove, the process being substantially automatic in operation.

In these processes water has been employed as a cooling agent, and in some respects has ideal characteristics. It is easily obtained, has great thermal capacity and can be conveniently directed and controlled. If properly brought into heat transferring relationship to the catalyst and the reaction vapors it will be caused to boil. This will result in the absorption of great quantities of heat from the catalyst and the reacting gases because of the large amount of heat (latent heat of vaporization) required to effect its boiling operation.

The use of mercury has been proposed but this material presents serious difficulties. In the first place its boiling point is too low for successful application without special though well-known methods of treatment which add materially to the cost of operation. Its high cost makes unlimited use, like that of water, prohibitive. In addition it has a relatively low degree of heat absorption and a relatively low rate of heat conductivity. It is also subject to oxidation and its high specific gravity necessitates special and costly means for supporting and containing it.

In carrying out the present invention we have discovered that if a composite metal, consisting of one or more metals that will boil below the desired temperature of the reaction and one or more metals that will boil above the said desired temperature of the reaction, is formed in proper proportions, and this composite metal is placed in heat-transferring relation to the catalyst and the reacting gases, it will be caused to boil at a temperature close to but slightly below the desired temperature of the reaction and may be thus made to control the temperature of the reaction and keep the same well within maximum limits while permitting it to reach and maintain an efficient minimum. In addition this composite metal will have a low melting point, great thermal capacity and conductivity and relatively light specific gravity.

Taking the above mentioned process as an example of the practical application of the invention, in the exothermic reaction of converting naphthalene to phthalic anhydride by the air oxidation process, a heated mixture of air or other oxygen containing gas and naphthalene in the vapor phase and at a suitable temperature, is brought into the presence of a suitable catalyst,—for instance, vanadium oxide. The naphthalene is thereby converted into phthalic anhydride and a large amount of heat is thereby generated, resulting in high temperatures unless controlled. The reaction temperature as above stated should run between 400° and 450° C. and the desired temperature for the most effective working of this conversion process is ordinarily at approximately 425° C. Obviously temperatures materially above the same are not only undesirable but experience has demonstrated that very high temperature is detrimental to the product and apt to be disastrous to the reaction apparatus.

If lead, which boils at 1525° C., tin, having a boiling point of 2270° C., and mercury, which has a boiling point at 357° C., be mixed in certain proportions a composition can be obtained having a boiling point which is close to that of the desired reaction temperature. It has been discovered that if equal amounts of lead and tin are dissolved in varying amounts of mercury, in which the lead and tin readily dissolve, any desired boiling point within the desired limits may be secured. Thus, a composition made up of 20%, by weight, of equal parts of lead and tin with 80% by weight, of mercury is liquid at 20° C. and has a boiling point of approximately 370° C., whereas 20%, by weight, of mercury combined with 80% of equal parts, by weight, of lead and tin is liquid at about 160° C. and boils at approximately 450° C. If a working reaction temperature of 425° C. is taken as satisfactory, a boiling temperature of about 405° C. for the controlling composition would be substantially correct, and this can be obtained by a mixture of 60%, by weight of lead and tin and 40% by weight, of mercury. This particular mixture is liquid at about 120° C. The composition has other valuable features besides that of its boiling point. While the thermal conductivity of mercury is relatively low (.0189) that of lead is .083 and of tin .1423, so that the thermal conductivity of the composition is high, which is an important factor that assists it in its heat-dissipating qualities. Moreover the specific gravity of the composition is less than that of mercury.

In practicing the process the composite metal is brought into heat transferring relation to the zone of reaction by any suitable or obvious means, being held in a suitable container through the walls of which the heat of reaction will pass to the metal, causing the latter to boil and thereby absorb such heat. The vapors thus generated may be collected, condensed and returned to heat-transferring relation to the zone of reaction for reuse, the low melting point of the metal making this easy of accomplishment.

Thus in the accompanying drawing—

Figure 1:
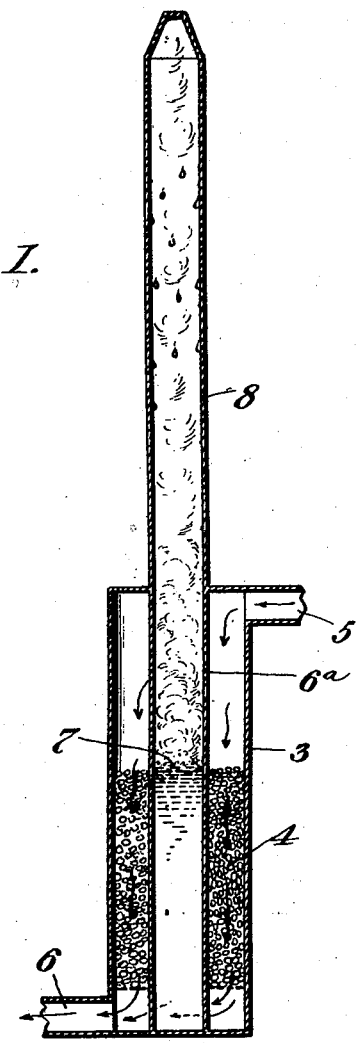
Figure 1 is a vertical sectional view, diagrammatic in character, of a type of apparatus for carrying out the process.
Figure 2:
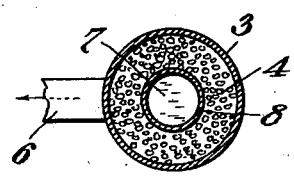
Figure 2 is a cross sectional view of the same.

A chamber 3 containing a catalyst 4 is provided with an inlet 5, through which the preheated gases as above described are introduced, and an outlet $5^a$ from which the treated gases pass for further treatment. Inside this chamber is a container $6^a$ in which the composite metal 7 is placed. The vapors from the boiling metal 7 rise to a condenser 8 in which the composition, having a low melting point, will be condensed to a fluid condition and will gravitate back to heat-transferring relationship to the zone of reaction.

Having thus fully described our invention, what we claim as new, and desire to secure by Letters Patent, is:—

1. The process of carrying on catalytic reactions which consists in subjecting the material to be treated when in the vapor phase to the presence of a catalyst and thereby generating heat, and withdrawing the excess of heat by boiling thereby a composition that will boil close to the desired heat of the reaction and is composed of lead, tin and mercury.

2. The process of carrying on catalytic reactions which consists in subjecting the material to be treated when in the vapor phase to the presence of a catalyst and thereby generating heat, and withdrawing the excess of heat by boiling thereby a composition that will boil close to the desired heat of the reaction and is composed of lead and tin in equal parts and a third part of mercury.

3. The process of carrying on vapor phase oxidation treatment of materials which consists in subjecting the material and oxygen to the presence of a catalyst to a temperature of about 425° C. and carrying off the excess heat of the reaction by causing such heat to boil a mixture of approximately 60 percent by weight of lead and tin, and 40 percent by weight of mercury.

4. The process of producing phthalic anhydride from naphthalene which consists in subjecting the vapors of naphthalene mixed with an oxygen containing gas to the presence of a catalyst, maintaining a reaction temperature of approximately 425° C., and preventing an excess temperature by causing the excess heat of the reaction to be absorbed by and boil a composition of substantially 60 percent by weight of lead and tin and 40 percent of mercury.

In testimony whereof we affix our signatures.

FRANK A. CANON.
CHESTER E. ANDREWS.